US012769530B2

(12) United States Patent
Siddesh et al.

(10) Patent No.: US 12,769,530 B2
(45) Date of Patent: Oct. 20, 2026

(54) METHOD FOR INTEGRATING AN AUTOMATION TECHNOLOGY FIELD DEVICE IN A DISTRIBUTED LEDGER

(71) Applicant: Endress+Hauser Flowtec AG, Reinach (CH)

(72) Inventors: Sushil Siddesh, Basel (CH); Johannes Sprenger, Lörrach (DE); Jenish Gheewala, Basel (CH); Matthias Brenzinger, Staufen (DE); Karl Büttner, Neuenburg (DE)

(73) Assignee: Endress+Hauser Flowtec AG, Reinach (CH)

( * ) Notice: Subject to any disclaimer, the term of this patent is extended or adjusted under 35 U.S.C. 154(b) by 108 days.

(21) Appl. No.: 18/042,343

(22) PCT Filed: Jul. 16, 2021

(86) PCT No.: PCT/EP2021/070007
§ 371 (c)(1),
(2) Date: Feb. 21, 2023

(87) PCT Pub. No.: WO2022/037865
PCT Pub. Date: Feb. 24, 2022

(65) Prior Publication Data

US 2023/0315417 A1 Oct. 5, 2023

(30) Foreign Application Priority Data

Aug. 21, 2020 (DE) ..................... 10 2020 121 982.2

(51) Int. Cl.
*G06F 9/44* (2018.01)
*G06F 8/61* (2018.01)

(52) U.S. Cl.
CPC ...................................... *G06F 8/61* (2013.01)

(58) Field of Classification Search
None
See application file for complete search history.

(56) References Cited

U.S. PATENT DOCUMENTS

2018/0167217 A1* 6/2018 Brady ........................ G06F 8/65
2019/0339668 A1* 11/2019 Biernat ................. G06F 16/248
(Continued)

FOREIGN PATENT DOCUMENTS

CN 110489946 A 11/2019
CN 110619022 A * 12/2019 ........... G06F 16/275
(Continued)

*Primary Examiner* — Insun Kang
(74) *Attorney, Agent, or Firm* — Brannon Sowers & Cracraft PC

(57) ABSTRACT

An automation technology field device includes operating electronics and a plurality of parameters. The operating electronics are designed to operate the field device based on the parameters and obtain and process data based on the parameters. A firmware is a software container allocated to the operating electronics. The software container is designed to execute the installed code to establish, using the code, a communication connection to a distributed ledger via at least one of the outputs is a higher-level communication network, to integrate the field device in the distributed ledger-and to process and/or combine at least one part of the obtained and processed data into result data and to transmit the result data to the distributed ledger.

10 Claims, 1 Drawing Sheet

(56) References Cited

U.S. PATENT DOCUMENTS

| | | | | |
|---|---|---|---|---|
| 2019/0339678 | A1 | 11/2019 | Biernat et al. | |
| 2019/0340379 | A1* | 11/2019 | Beecham | G06F 16/9014 |
| 2019/0369584 | A1 | 12/2019 | Stefan | |
| 2020/0142681 | A1* | 5/2020 | Marks | G06F 11/3051 |
| 2021/0294913 | A1* | 9/2021 | Mackenzie | G06F 16/182 |
| 2021/0342427 | A1* | 11/2021 | Popov | G06F 16/27 |
| 2021/0373875 | A1* | 12/2021 | Solomon | G06F 8/65 |

FOREIGN PATENT DOCUMENTS

| | | | |
|---|---|---|---|
| CN | 111435239 | A | 7/2020 |
| CN | 111435349 | A | 7/2020 |
| DE | 102012112427 | A1 | 6/2014 |
| DE | 102016118613 | A1 | 4/2018 |
| DE | 102018208379 | A1 | 10/2019 |
| DE | 102020100874 | A1 | 7/2020 |
| EP | 3557463 | A1 | 10/2019 |
| WO | 2018059850 | A1 | 4/2018 |

* cited by examiner

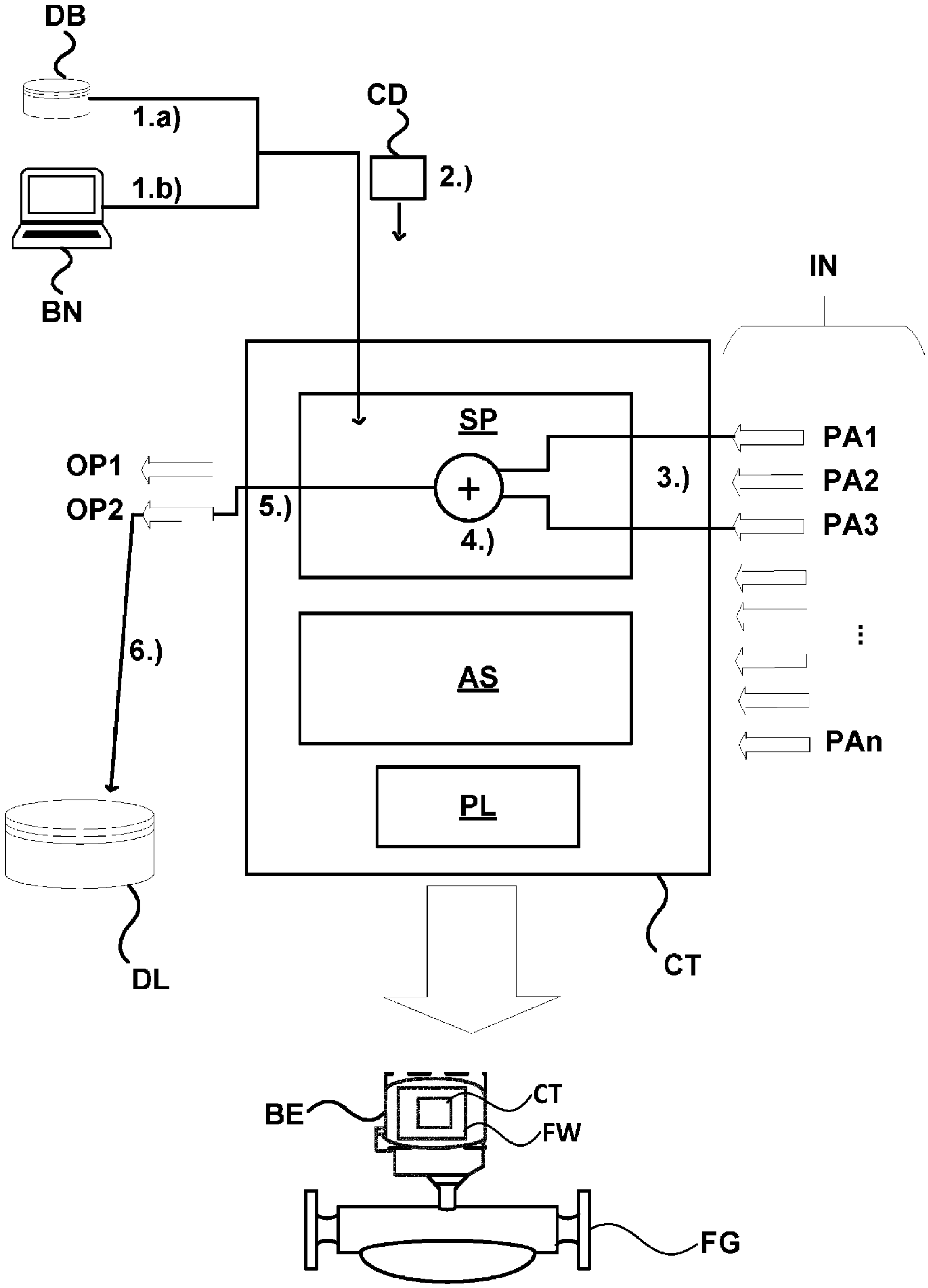
DB
1.a)
1.b)
BN
CD
2.)
IN
SP
PA1
PA2
PA3
PAn
3.)
OP1
OP2
5.)
4.)
AS
PL
6.)
DL
CT
BE
CT
FW
FG

METHOD FOR INTEGRATING AN AUTOMATION TECHNOLOGY FIELD DEVICE IN A DISTRIBUTED LEDGER

CROSS-REFERENCE TO RELATED APPLICATIONS

The present application is related to and claims the priority benefit of DPMA Patent Application No. 10 2020 121 982.2, filed on Aug. 21, 2020 and International Patent Application No. PCT/EP2021/070007, filed on Jul. 16, 2021, the entire contents of which are incorporated herein by reference.

TECHNICAL FIELD

The invention relates to a field device of automation technology having operating electronics and a plurality of parameters. In addition, the invention comprises a method for integrating a field device according to the invention into a distributed ledger.

BACKGROUND

Automation components that are used in industrial installations are already known from the prior art. For example, field devices are used as automation components used in process automation technology as well as in manufacturing automation technology. Field devices, in general, refer to all devices which are process-oriented and which supply or process process-relevant information. Field devices are thus used for detecting and/or influencing process variables. Measuring devices, or sensors, are used for detecting process variables. These are used, for example, for pressure and temperature measurement, conductivity measurement, flow measurement, pH measurement, fill-level measurement, etc., and capture the corresponding process variables of pressure, temperature, conductivity, pH value, fill level, flow, etc. Actuators are used for influencing process variables. These are, for example, pumps or valves that can influence the flow of a fluid in a pipe or the fill level in a tank. In addition to the aforementioned field devices, automation components are also understood to include gateways, edge devices, remote I/Os, radio adapters, or, generally, devices that are arranged at the field level.

A variety of such field devices are produced and marketed by the Endress+Hauser group.

In modern industrial installations, field devices are usually connected via communications networks, such as fieldbuses (Profibus®, Foundation® Fieldbus, HART®, etc.), to higher-level units. Usually, the higher-level units are control systems or control units, such as e.g. an SPC (stored program control) or a PLC (programmable logic controller). The higher-level units are used, among other things, for process control, process visualization, and process monitoring as well as for commissioning the field devices. The measured values acquired by field devices—sensors, in particular—are transmitted via the connected bus system to one, or possibly even multiple, higher-level unit(s). In addition, a data transfer from the higher-level unit via the bus system to the field devices is also required—in particular, for configuration and parametrization of field devices, as well as for the control of actuators.

Custody transfer systems are used in particular in the oil and gas industry and for transactions and the transportation of physical substances between two operators. Such a custody transfer system includes one or more automation components which are used to capture the quantity of a transported physical substance, and also for data storage of the transactions. All transactions must be carried out and recorded in a tamperproof and unassailable manner. The automation components, in particular the field devices, must be calibrated and be certified in this regard by an authority.

So-called DLT (distributed ledger technology)-based databases, which are implemented via the Internet or a local network, are available for the secure recording of the transactions. The distributed ledger technology makes it possible to store all data stored in the database on a plurality of networked participant nodes. The totality of all unique data entries is referred to as the "ledger". By means of suitable measures, it is ensured that new transactions to be added are taken over in all copies of the ledger and that there is a consensus of all participant nodes regarding the current state of the ledger. Known examples of such DLTs are "blockchain", "blockDAG" or "TDAG". If a field device with network connectivity is to be integrated into a specific DLT environment (such as those of trading partners, metrological administration committees, government agencies), then a DLT-environment-specific component (such as code or hardware) must be added to the field device.

However, only the developers of the field device can load into the field device the software component required to integrate the field device into a distributed ledger. Customers cannot provide their own DLT code for the the field device. They are also unable to select specific data points provided by the field device and to be placed into the distributed ledger (such as process variables, configuration/status information, etc.). For this reason, a rapid integration of the field device into a distributed ledger is not possible.

SUMMARY

The invention is based upon the object of integrating a field device into a distributed ledger in a simple manner.

The object is achieved by a field device of automation technology, with operating electronics and a plurality of parameters, wherein the operating electronics are configured to operate the field device on the basis of the parameters and to gather or process data on the basis of the parameters, wherein the operating electronics are allocated firmware having a software container, the software container comprising:

- a finite quantity of inputs for acquiring the data gathered or processed according to the parameters of the field device;
- a finite number of outputs which correspond to communication channels of the measuring device, wherein the communication channels for connecting the field device are designed with a higher-level communication network, for example the Internet or a local network;
- a specific amount of reserved memory space in the electronics unit in order to install code;
- a specific amount of reserved main memory in the electronics unit that is required for executing the installed code;
- a specific amount of processor runtime of the electronics unit that is reserved for the execution of the installed code;
- wherein the software container is configured to execute the installed code and, by means of the code, to establish a communication link to a distributed ledger via at least one of the outputs via the higher-level communication network, to integrate the field device into the distributed ledger, and to process and/or combine at least a portion of the gathered or processed data into result data, and to transmit the result data to the distributed ledger.

The field device according to the invention can be easily and rapidly integrated into any distributed ledger. Distributed ledger refers to a database configured according to the distributed ledger technology and which exists over multiple locations or amongst several participant nodes. For this purpose, the firmware of the field device is updated such that it contains a specific software container. The software container enables the execution of a code for integrating the field device into the distributed ledger, data processing and data transmission into the distributed ledger, and keeps resources of the electronics unit free for these tasks. The code is freely selectable for any distributed ledger, including from third party providers. The code can be overwritten as desired.

Field devices that are mentioned in connection with the method according to the invention have already been given as examples in the introductory part of the description. For example, a field device in connection with the invention is used in a custody transfer system. However, it will be appreciated that the field device may be used for any use case in other industries.

An advantageous embodiment of the field device according to the invention provides for the field device to be a measuring device with at least one sensor unit for gathering a physical raw measurement variable of a process-engineering process, a network device, in particular a gateway, a remote I/O, a switch or an edge device, or a control unit, in particular a control unit. Further examples of field devices have already been listed in the introductory part of the description.

An advantageous embodiment of the field device according to the invention provides that data gathered or processed according to the parameters are at least one of the following:

- raw measurement variables acquired by the sensor unit;
- measured values and further variables formed from the raw measurement variables, for example volumes or calculations transmitted within a defined time interval;
- status information, in particular corresponding to the NAMUR recommendation; and
- diagnostic data, in particular heartbeat data.

It goes without saying that all data generated by a field device, even data not listed here, can be loaded into the distributed ledger.

According to an advantageous embodiment of the field device according to the invention, it is provided that the code has a network address of the distributed ledger and a login routine for the distributed ledger. In addition to the access data (e.g. user name and password), the login routine contains specific information about how the field device has to behave in the distributed ledger, for example in which frequency data for the distributed ledger can be transmitted, whether the field device forms an active participant node (for example for verifying transactions of other field devices), whether the field device stores at least a part of the ledger of the distributed ledger, etc.

Furthermore, the object is achieved by a method for incorporating a field device according to the invention into a distributed ledger, in particular designed according to blockchain, blockDAG or TDAG, comprising:

- installing in the software container a software code loaded into the field device;
- processing or combining data from at least one of the inputs into result data;
- establishing a communication link to the distributed ledger via at least one of the outputs via a higher-level communication network; and
- transmitting the result data to the distributed ledger via at least one of the outputs.

The method according to the invention enables the integration of a field device into a distributed ledger without the firmware of the field device needing to be overwritten (in the sense of adapted, recompiled and installed) again during each integration process.

According to an advantageous variant of the field device according to the invention, it is provided that the field device is integrated in the distributed ledger following the first establishment of the communication connection with the distributed ledger according to the code. For this purpose, the above-mentioned login routine is used, which is parts of the code.

According to an advantageous variant of the field device according to the invention, it is provided that after integration into the distributed ledger, the field device functions as a participant node, in particular as a light node. A light node is characterized in that it stores a part of the data of the entire ledger. However, the light node must be connected to a full node in order to ensure that the stored data are correct. Under certain circumstances, in the case of suitable performance, the field device can also be designed as a full node, thus involved in verifications of current transactions of other participants, and can also store the complete ledger. The precise properties and tasks of a light node, or a full node, differ for the respective types of digital ledger technology and can be seen in the respective specifications. The necessary resources of the electronics unit for performing these tasks are kept free by the software container.

According to an advantageous variant of the field device according to the invention, it is provided that the code is created by a user and loaded into the field device. For this purpose, the field device has an interface, for example a wireless interface for communication via a wireless protocol, for example WiFi or Bluetooth LE, or a wired interface for communication via a fieldbus network or Ethernet network.

According to an advantageous variant of the field device according to the invention, it is provided that the field device downloads the code from a database via the Internet or the higher-level communication network. Loading is initiated either by the database itself, for example by a suitable code in the database being selected by the user, or by the user's selection at the field device, for example on a display/operating element of the field device, for example a (touch) display, in those cases where the database provides the field device with the list of downloadable codes.

BRIEF DESCRIPTION OF THE DRAWING

The invention is explained in greater detail with reference to the following figure. The following is shown:

FIG. 1 shows an exemplary embodiment of the method according to the present disclosure.

DETAILED DESCRIPTION

FIG. 1 shows a field device FG of automation technology, in this example a flowmeter. However, the invention can be applied to any type of field device FG. In addition to the measurement sensor system, the field device FG has operating electronics BE which comprises a non-volatile memory, a main memory and a microprocessor. The operation of the field device FG via the operating electronics BE is controlled via firmware FW. In the present invention, the field device FG has special firmware FW which has a software container. The software container reserves a part of the resources of the operating electronics BE, i.e., a certain amount of reserved memory space SP in order to install code CD, a specific amount of reserved main memory AS of the operating electronics BE which is required for the execution of the installed code CD, and a certain amount of processor runtime for executing the code CD. This special firmware FW is either initially loaded during manufacture of the field device FG, or the operator overwrites the initial firmware of the field device FG with the special firmware FW at a later time.

The field device can be incorporated into a distributed ledger DL by means of the special firmware FW, to put it more precisely, by means of the software container CT.

Firstly, the code CD is loaded into the software container CT on the field device FG. The code CD serves for the later connection of the field device FG to the distributed ledger DL as well as for the pre-processing and the transmission of data to the distributed ledger DL. In a first step 1.a), the field device FG downloads the code from a database DB, for example a cloud-based database of the device manufacturer. For this purpose, the operator BD selects from the database DB the code appropriate for the distributed ledger DL. Alternatively, the operator BD generates the code CD in method step 1.b) itself. In method step 2.), the code is loaded into the dedicated memory SP of the software container CT.

The field device FG has a plurality of parameters PA1, PA2, PA3, . . . , PAn. These parameters PA1, PA2, PA3, . . . , PAn define which data the field device FG gathers or processes. The data are, in particular, process values, status information or diagnostic data. The software container CT provides a set of finite inputs IN. A subset of the parameters PA1, PA2, PA3, . . . , PAn is mapped onto the inputs IN. The assignment takes place via a configuration menu available in the FG. The code CD here defines which data are read in on the basis of which parameters PA1, PA2, PA3, . . . , PAn. In a third method step 3., data of the field device FG are read in via the respective assigned inputs IN on the basis of the parameters PAI and PA3. The code CD cannot access parameters PA1, PA2, PA3, . . . , PAn directly here, but only the inputs IN. These are then processed or combined with one another in a method step 4.) to form result data.

After execution of the code CD, the field device FG establishes a connection to the distributed ledger DL via the higher-level communication network, for example the Internet or a local area network. The field device FG has a plurality of interfaces or outputs OP1, OP2. In the present case, the output OP1 is provided for the connection to a fieldbus network via which the field device regularly transmits its data. The connection to the distributed ledger DL via the higher-level communication network is established by means of the output OP2. For this purpose, the code CD has login information and the address of the distributed ledger DL. It can be provided that the distributed ledger DL then transmits further software components to the field device FG, for example when the field device FG continues to function as a light node in the distributed ledger DL. These additional software components are likewise stored in the dedicated memory SP and executed by the software container.

In a method step 5.), the result data are routed to the output OP2. The result data are then transmitted to the distributed ledger DL, verified according to the standard of the distributed ledger DL, and stored in the distributed ledger DL.

If the operator BD wishes to use a different distributed ledger DL, he can load new code CD in accordance with method steps 1.) and 2.), replacing the old code. It is also optionally possible to load a plurality of codes CD, so that the field device FG functions via various additional outputs as participant nodes of various distributed ledgers DL.

The invention claimed is:

1. A field device of automation technology, the field device including operating electronics and a plurality of parameters, wherein the operating electronics are configured to operate the field device on the basis of the parameters and to gather or process data on the basis of the parameters, wherein firmware with a software container is assigned to the operating electronics, wherein the software container comprises:

a finite quantity of inputs to acquire the data gathered or processed according to the parameters of the field device;

a finite number of outputs which correspond to communication channels of the field device, wherein the communication channels are designed for connecting the field device to a higher-level communication network;

a specific amount of reserved memory space in the operating electronics in order to install code;

a specific amount of reserved main memory in the operating electronics that is required to execute the installed code;

a specific amount of processor runtime of the operating electronics that is reserved to execute the installed code;

a reserved resource of the operating electronics specific to a functionality of the field device as one of a full node or a light node in a distributed ledger;

wherein the software container is designed to execute the installed code and, by means of the code, to establish a communication link to the distributed ledger via at least one of the outputs via the higher-level communication network, to integrate the field device into the distributed ledger, and to process and/or combine at least a portion of the gathered or processed data into result data, and to transmit the result data to the distributed ledger;

wherein the code includes a network address of the distributed ledger, and a login routine for the distributed ledger including access data and field device behavior information specific as to how the field device has to behave in the distributed ledger including whether the field device forms the light node in the distributed ledger, and to process and transmit the data gathered or processed according to the parameters of the field device;

wherein the specific amount of reserved memory space for installing the code, and the specific amount of reserved main memory and the specific amount of processor runtime for executing the code, are maintained by the software container free for the integration of the field device into the distributed ledger, and the software container maintains resources of the operating electronics free for the processing and transmitting of the data gathered or processed according to the parameters of the field device;

wherein the code is user-selectable for different distributed ledgers, including from third-party providers, and is overwritable as desired without overwriting the firmware.

2. The field device according to claim 1, wherein the field device is a measuring device with at least one sensor unit for acquiring a physical raw measurement variable of a process-engineering process, a network device, in particular a gateway, a remote input/output (I/O), a switch or an edge device, or a control unit.

3. The field device according to claim 1, wherein data gathered or processed according to the parameters are at least one of the following: raw measurement variables acquired by a sensor unit; measured values formed from the raw measurement variables; status information, in particular corresponding to a User Association of Automation Technology in Process Industries (NAMUR) recommendation; and diagnostic data, in particular heartbeat data.

4. The field device according to claim 1, wherein the field device is incorporated into a distributed ledger, in accordance with blockchain, Directed Acyclic Graph (blockDAG) or Transaction Directed Acyclic Graph (TDAG).

5. The field device according to claim 4, wherein the field device is integrated into the distributed ledger following a first-time establishment of a communication connection with the distributed ledger according to the code.

6. The field device according to claim 5, wherein after integration into the distributed ledger, the field device functions as a participant node.

7. The field device according to claim 5, wherein the code is created by a user and loaded into the field device.

8. The field device according to claim 5, wherein the field device downloads the code from a database via the Internet or the higher-level communication network.

9. A method for operating a field device of automation technology comprising:

installing code on a specific amount of reserved memory space of firmware of a software container assigned to operating electronics of the field device and including a finite quantity of inputs to acquire data gathered or processed according to a plurality of parameters of the field device and a finite number of outputs which correspond to communication channels of the field device;

executing the installed code via a specific amount of reserved main memory in the operating electronics that is required to execute the installed code and via a specific amount of processor runtime of the operating electronics that is reserved to execute the installed code;

establishing a communication link to a distributed ledger via at least one of the outputs; and integrating the field device into the distributed ledger via a login routine of the installed code containing a network address of the distributed ledger and information specific as to how the field device has to behave in the distributed ledger including whether the field device forms a light node in the distributed ledger;

wherein the integrating the field device into the distributed ledger further includes integrating the field device as one of a full node or the light node in the distributed ledger via a reserved resource of the operating electronics specific to functionality of the field device as the light node in the distributed ledger;

wherein the specific amount of reserved memory space, the specific amount of reserved main memory and the specific amount of processor runtime are maintained by the software container free to integrate the field device into the distributed ledger, wherein the software container maintains resources of the operating electronics free to process and transmit the data gathered or processed according to the parameters of the field device; and wherein the code is user-selectable for different distributed ledgers, including from third-party providers, and is overwritable as desired without overwriting the firmware.

10. A field device of automation technology, the field device including operating electronics and a plurality of parameters, wherein the operating electronics are configured to operate the field device on the basis of the parameters and to gather or process data on the basis of the parameters, wherein firmware with a software container is assigned to the operating electronics, wherein the software container comprises:

a finite quantity of inputs to acquire the data gathered or processed according to the parameters of the field device;

a finite number of outputs which correspond to communication channels of the field device, wherein the communication channels are designed for connecting the field device to a higher-level communication network;

a specific amount of reserved memory space in the operating electronics in order to install code;

a specific amount of reserved main memory in the operating electronics that is required to execute the installed code;

a specific amount of processor runtime of the operating electronics that is reserved to execute the installed code;

wherein the software container is designed to execute the installed code and, by means of the code, to establish a communication link to the distributed ledger via at least one of the outputs via the higher-level communication network, to integrate the field device into the distributed ledger, and to process and/or combine at least a portion of the gathered or processed data into result data, and to transmit the result data to the distributed ledger;

wherein the code includes a network address of the distributed ledger, and a login routine for the distributed ledger including access data and field device behavior information specific as to how the field device has to behave in the distributed ledger; and wherein the specific amount of reserved memory space for installing the code, and the specific amount of reserved main memory and the specific amount of processor runtime for executing the code, are maintained by the software container free for the integration of the field device into the distributed ledger, and the software container maintains resources of the operating electronics free to process or combine the at least a portion of the gathered or processed data into result data, and transmit the result data; and wherein the code is user-selectable for different distributed ledgers, including from third-party providers, and is overwritable as desired without overwriting the firmware.

* * * * *